Dec. 31, 1929. M. J. WEBER 1,741,174
BODY MEASURING DEVICE
Filed July 22, 1926 2 Sheets-Sheet 1
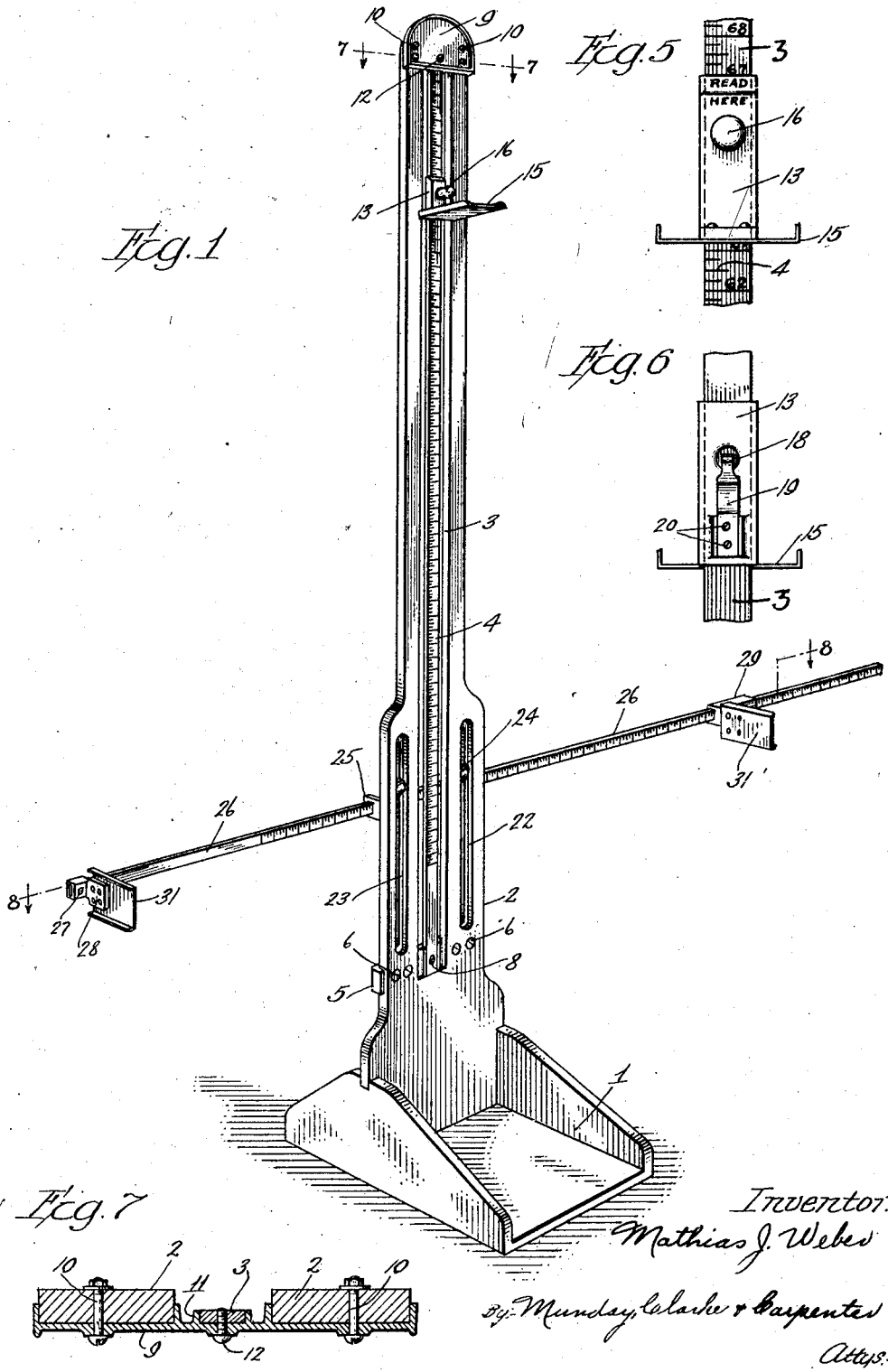

Dec. 31, 1929.                M. J. WEBER                1,741,174
                         BODY MEASURING DEVICE
                          Filed July 22, 1926            2 Sheets-Sheet 2
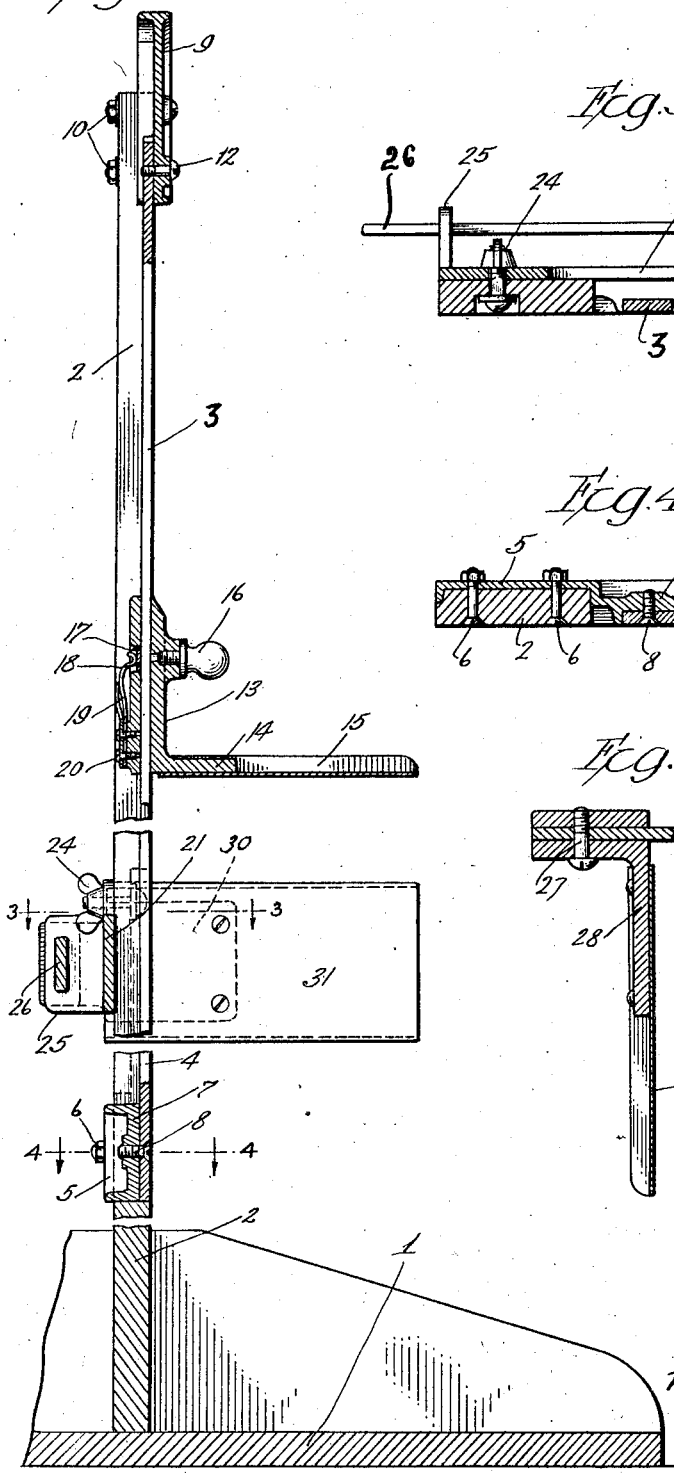
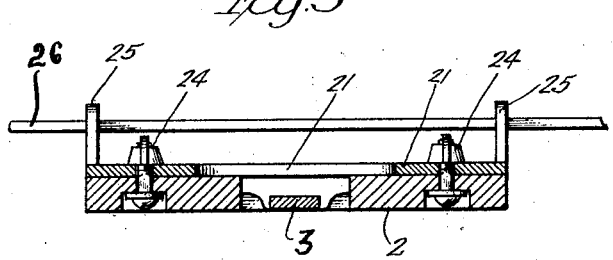
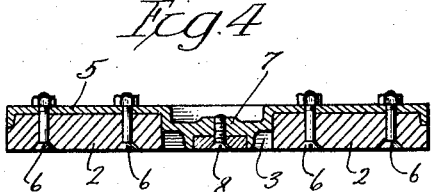
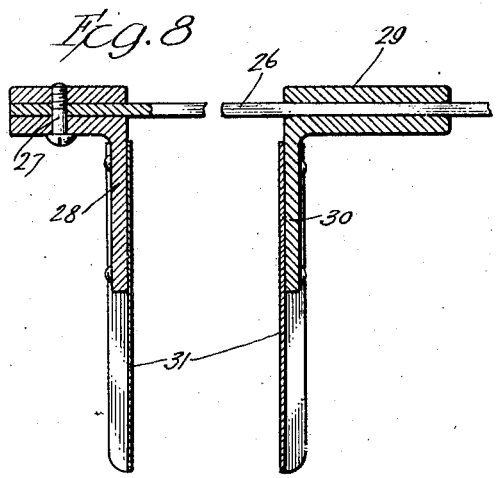
Inventor:
Mathias J. Weber
By:
Munday, Clarke & Carpenter
Attys.

Patented Dec. 31, 1929

1,741,174

UNITED STATES PATENT OFFICE

MATHIAS J. WEBER, OF CHICAGO, ILLINOIS, ASSIGNOR TO CONTINENTAL SCALE WORKS, OF CHICAGO, ILLINOIS, A CORPORATION OF ILLINOIS

BODY-MEASURING DEVICE

Application filed July 22, 1926. Serial No. 124,254.

This invention relates to devices for measuring the human body.

One of the objects of my invention resides in providing a measuring device adapted accurately to measure the height of a person.

Another object of my invention resides in providing a device for not only measuring the height of a person in standing position but also for accurately measuring the height of a person when in sitting posture.

Still another object of my invention resides in providing a combined device for measuring the height of a person and also for measuring the arm span or reach of a person.

Still another object of my invention resides in providing a device for measuring the height of human beings, wherein the shiftable indicator is adapted to remain in indicating position whereby to facilitate the reading and recording of the measured height.

Yet another object of my invention resides in providing a combined device for measuring the height of an individual and also his arm span or reach, wherein the span measuring device is adapted to be shifted into compact relation with the remaining portion of the device to facilitate storage or transportation.

Yet another object of my invention resides in the details of construction of my improved apparatus whereby the accurate measuring of an individual is assured.

Numerous other objects and advantages of the invention will be apparent as it is better understood from the following description, which, taken in connection with the accompanying drawings, discloses a preferred embodiment thereof.

Referring to the drawings,

Figure 1 is a perspective view of my improved body measuring device;

Fig. 2 is a side sectional view thereof;

Fig. 3 is a section taken on line 3—3 of Fig. 2;

Fig. 4 is a section taken on line 4—4 of Fig. 2;

Fig. 5 is a detail front view of the height indicator;

Fig. 6 is a rear view of the same;

Fig. 7 is a sectional view taken on line 7—7 of Fig. 1; and

Fig. 8 is a section taken on line 8—8 of Fig. 1.

In general my device embodies a platform or base upon which the individual to be measured either stands or sits. Extending upward from this platform is a standard which carries flush at its face a vertical measuring strip calibrated into inches or any desired divisions. The standard is also constructed as a guideway for a forwardly extending horizontally disposed slide which may be adjustable vertically along the calibrated strip and can move into contact with the head of the person to be measured and this slide as it moves over the calibrated strip indicates instantly the exact height of a person. The slide is provided with means for maintaining it in adjustable position so that once the reading is made the registration is preserved until the slide is forcibly moved again. By mounting the vertical stand on the platform and exactly at right angles, and by having the calibrated measuring strip flush with the face of the stand, with the slide adjustable along the calibrated strip so as to contact with the head of the person to be measured, an arrangement is secured whereby the person must necessarily stand erect with his feet flat on the platform against the front face of the base of the stand and his body erect and his head squarely against the stand so that there is no chance for an inaccuracy due to the person being measured bending forwardly or backwardly and thus not standing erect. In addition, by arranging the arm span measuring device on the vertical stand and making it vertically adjustable therealong, the reach of any person to be measured may be correctly ascertained by having the person sit on the platform with his body and head squarely against the front face of the stand, so that such person by stretching out his arms can have his reach accurately measured. The vertical adjustment of the reach measuring device permits it to be adjusted to various heights whereby to accommodate variation in body measurements of different people.

Referring to the drawings in detail, my improved device comprises a platform 1, preferably of wood, upon which the person to be measured should stand, or, when measuring the height of the trunk and reach, should sit. Upstanding vertically from this platform is a standard 2, also preferably of wood, this stand being arranged at right angles to the flat platform. The stand 2 provides a support so that when a person stands with feet on the platform, with heels touching the back of the front face of the stand and with body and the back of the head contacting with the stand throughout his length, all danger of inaccuracies due to the stooping or backward swaying of the person during measurement is obviated.

The stand is provided with a centrally disposed longitudinal strip 3 which extends from a point near the base of the stand to its upper end. This strip 3 is provided with calibrations 4 which are arranged to provide a scale which may be in notches or in any other unit of measurement. The strip 3 is mounted upon the stand 2 with its calibrated face flush with the front surface of the stand 2. This is preferably accomplished by providing the base of the stand with a metal bracket 5, which is secured by means of screws 6 to stand 2. This bracket has a forwardly extending intermediate portion 7 formed with a channel adapted to receive the strip 3. The body of the strip 3 is secured in this channel by means of a screw 8. At its upper end the strip 3 is held to the stand 2 by means of a front plate 9 substantially semi-circular and carrying bolts 10 passing through perforations in the stand 2. The intermediate portion of this bracket 9 is grooved as at 11 to receive the strip 3 which is secured to the plate by a screw or other fastening means 12 which passes through the strip 3 as shown clearly in Fig. 7.

A slide is adapted to move along the calibrated strip 3. This slide comprises a bracket 13 adapted to embrace and slide upon the strip 3, being formed with a guideway through which passes the strip 3. The upper portion of this bracket 13 is provided with a forwardly extending hand hold 16 adapted to provide means for manipulating the bracket up and down upon the strip 3. At the rear of the bracket 13 opposite the hand hold 16 a perforation 17, in which a fibre washer 18 is disposed, is formed in the walls of the bracket. The rear of the bracket 13 is provided with a leaf spring 19 secured thereto as at 20 and having an upper end bent inwardly into engagement with the fibre washer 18 in order to provide resilient contact between the washer and the rear face of the strip 3. By means of this friction device the bracket 13 of the slide is held in any vertically adjusted position. It will thus be seen that when a person to be measured stands upon the platform 1 with his heels, back and head touching the support or stand 2, he will necessarily be required to stand erect. When thus positioned the slide is manipulated to bring it downwardly into contact with the top of the so positioned person's head and the indicated height is then read from the top of the slide as shown clearly in Fig. 5. It will be noted that by means of the fibre washer 18 and leaf spring 19 the slide is maintained in indicating position so that a reading of the measured height can be made without any danger of the slide slipping from arranged position. The fibre washer 18 while forming a friction grip also prevents scoring of the rear face of the calibrated strip 3.

When it is desired to measure the trunk height of a person, he sets upon the platform 1 with his back in direct contact with the stand 2. In this position the slide 15 then descends to contact with the head and the indicating reading is then recorded.

My invention contemplates the combination of a reach or arm span measuring device with a height measuring device which in the preferred form of the invention illustrated comprises a bracket member 21 shown clearly in Fig. 3, and which is provided with spaced perforations through which pass bolts which in turn pass through longitudinal slots 22 and 23 vertically disposed on the stand 2. By adjusting the wing nuts 24 this bracket member 21 may be held in any vertically adjusted position. This bracket is provided with rearwardly extending arms 25, which in turn are formed with vertically arranged slots adapted to receive a calibrated reach measuring rod 26 which is arranged to extend in a horizontal plane and transversely of the calibrated strip 3. One end of this calibrated reach measuring rod 26 has a bracket 28 bolted thereto as at 27, while the other end of the reach measuring rod 26 is provided with a slider 29 carrying a bracket 30. The brackets 28 and 30 are provided with finger contact plates 31 and 31', and the arrangement is such that when a person sits upon the platform 1, with his back firmly against the stand 2 and with his arms outstretched laterally, when the bracket 21 is adjusted vertically of the stand 2 to correspond to the plane of his arms, the rod 26 may be shifted through the arms 25 until finger plate 31 on bracket 28 is just in contact with the tips of the outstretched fingers of one arm. The finger plate 31' of slide 29 is then adjusted along the rod 26 until the outstretched finger tips of the other arm are just in contact with this plate 31'. The correct measurement of the length of the span between outstretched finger tips may then be read from the calibrated rod 26.

An important feature of my invention resides in mounting the bracket 21 on the stand 2 so that the rod 26 may be folded compactly with the remaining portion of the device. I accomplish this by the mounting shown clearly in Figure 3. It will be understood that by loosening one of the wing nuts 24 and removing the corresponding bolt the bracket 22 is then free to pivot about the other bolt so that the bracket may be swung from its normal transverse position to a vertical position, the lower side of the bracket swinging outwardly, in which case the rod 26 will swing into vertical position and register with the back of the stand 2. The rod 26 with its finger plates 31 and 31' will thus be folded vertically behind the stand 2. This permits a compact arrangement of the device for transportation or storage.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. In a body measuring device, the combination of a platform upon which the person to be measured is adapted to stand or sit, a stand mounted on and projecting vertically upward from said platform and providing a rest against which the body and head of the person to be measured is adapted to contact, a stationary calibrated strip mounted on said stand and lying in the front plane thereof, a slide embracing and supported on said strip and movable vertically thereon and carrying a portion projecting at right angles from the front face of said stand, said slide being constructed and arranged to be moved relative to said strip to bring said plate into contact relation with the head of the person to be measured.

2. A body measuring device, comprising a platform and a stand mounted on and extending vertically therefrom, a calibrated strip extending longitudinally of said stand and mounted thereon, a slide supported by and shiftable along said strip and extending at right angles therefrom, said slide having means yieldably engaging said strip, and means for holding said slide in adjusted position.

3. A body measuring device comprising, a platform having a stand extending at right angles therefrom, a calibrated strip carried by said stand and lying substantially flush with the front face thereof, a head contacting plate slidable along said strip, a friction member on said plate contacting with said strip and means carried by said plate for pressing said washer against said strip to hold said plate in adjusted position.

4. A body measuring device comprising, a platform and a stand mounted thereon and extending vertically at a 90° angle therefrom, a calibrated strip carried by said stand, a bracket formed with a groove to receive said strip, said bracket having a plate extending at right angles and forwardly from said strip, the rear of said bracket having an aperture therein, a fibre washer in said aperture and a leaf spring carried by said bracket and pressing said washer into contact with the rear of said strip.

5. In a body measuring device, the combination of a platform and stand vertically mounted thereon, said stand having spaced slots longitudinally disposed thereon, means for mounting a bracket, a plurality of bolts passing through said bracket and said slots to adjustably hold said bracket in desired vertical adjustment, said bracket including spaced horizontal arms and a calibrated reach rod carried by said brackets, said reach rod having relatively adjustable finger contacting plates thereon.

6. In a body measuring device, the combination of a platform and a stand vertically and transversely mounted thereon, a calibrated strip mounted on said stand, a head contacting plate slidable along said strip, a bracket carried by said stand, a reach measuring rod carried by said bracket and normally disposed in horizontal position, relatively adjustable finger contacting plates carried by said reach measuring rod, and means for swingably mounting said bracket on said stand so as to permit said reach measuring rod to shift into vertical position and into the plane of said stand for packing and storage purposes.

7. In a body measuring device the combination of a base having an upwardly projecting standard, a calibrated strip removably secured in said standard, a slide member embracing said strip and mounted for vertical adjustment relative thereto, said slide member having a spring pressed engagement with said strip for determining vertical measurements, a horizontally disposed calibrated bracket member mounted for limited vertical movement on and relative to said standard, said bracket member being further mounted for horizontal movement relative to said standard, and finger engaging members carried on said bracket member, one of said members being adjustable longitudinally of said bracket for determining arm measurements.

MATHIAS J. WEBER.